United States Patent [19]

Collyer

[11] Patent Number: 4,721,386
[45] Date of Patent: Jan. 26, 1988

[54] THREE-AXIS ANGULAR MONITORING SYSTEM

[75] Inventor: Philip W. Collyer, Stamford, Conn.

[73] Assignee: Barnes Engineering Company, Shelton, Conn.

[21] Appl. No.: 888,032

[22] Filed: Jul. 18, 1986

[51] Int. Cl.$^4$ .......................... G01B 11/26; G01C 1/00
[52] U.S. Cl. ........................................ 356/152; 356/150
[58] Field of Search .................................. 356/152, 150

[56] References Cited

U.S. PATENT DOCUMENTS

| 3,375,750 | 4/1968 | Ellis et al. | 356/152 |
| 3,633,010 | 1/1972 | Svetlichny | 356/152 |
| 3,816,000 | 6/1974 | Fiedler | 356/152 |
| 3,865,483 | 2/1975 | Wojcik | 356/152 |
| 4,477,185 | 10/1984 | Berger et al. | 356/152 |
| 4,486,095 | 12/1984 | Mitchelson | 356/152 |

FOREIGN PATENT DOCUMENTS 0508669  3/1976  U.S.S.R. ............................. 356/152

OTHER PUBLICATIONS

T. Aruga et al, Applied Optics, vol. 21, #12, 15 Jun. '82, p. 2291.

Primary Examiner—Stephen C. Buczinski
Attorney, Agent, or Firm—Parmelee, Bollinger & Bramblett

[57] ABSTRACT

The three-axis angular position of a tetrahedral reflector which is mounted on a platform or element is monitored by first and second optical apparatus aimed at the reflector at equal angles on opposite sides of the axis of the reflective element thereby providing off-axis viewing of the reflective element for monitoring the angular movement of that element. The first optical apparatus is an autocollimator having a source of radiation for producing a beam of radiation which is applied to a beam splitter through a collimating lens which is aimed at the reflector. The return image from the reflector is passed through the beam splitter to a detector. The second optical apparatus may simply be a receiver including a second lens in optical alignment with a second detector with the lens being aimed at the tetrahedral reflector. The second optical apparatus may be in the form of an autocollimator of the same type as the first optical apparatus. A single instrument may also be provided with the off-axis looks provided by reflective elements in combination with suitable beam splitters using a single radiation source and a single detector.

16 Claims, 18 Drawing Figures

PITCH, YAW & ROLL

PURE PITCH

PURE YAW

PURE ROLL

PITCH & YAW

PITCH & ROLL

YAW & ROLL

THREE-AXIS ANGULAR MONITORING SYSTEM

BACKGROUND OF THE INVENTION

This invention relates to automatic optical alignment apparatus, and more particularly to such apparatus which senses the alignment condition of a remote body of interest and monitors the angular position thereof in three axes.

Automatic optical alignment instruments such as autocollimators are utilized for detecting very small changes in angular rotation of a reflective element such as a mirror, a retroreflective prism, or similar element which is mounted on a remote body whose alignment condition is of interest. The autocollimator is an optical instrument having a light source and a means for collimating a beam which is aimed at the reflector either directly or through a folded path and is reflected by the reflecting element with the reflected beam returning to the instrument nominally parallel to the emitted beam and then refocused to an image. Angular rotation of the remote element produces a movement of the image of the returning collimated beam which is applied to a detector and transformed into usable electrical signals providing an indication of the degree of rotation of the reflecting element. These signals can be utilized via suitable servomechanisms to align the rotating element or the signals may be used for some other purpose. The autocollimator described normally provides two-axis information and additional optical apparatus, for example, an automatic twist autocollimator which measures body rotation about the line of sight would be required to be incorporated with the automatic collimator already described in order to provide three axis information with respect to the angular movement of the reflector element. The combination of these instruments tends to be not only complex and costly but involves utilizing a common axis for making the measurements of the combined instruments whereby the multiple images following the same optical path may become contaminated and difficult to distinguish in order to provide the three axis information desired.

SUMMARY OF THE INVENTION

Accordingly, it is an object of this invention to provide a new and improved three axis angular monitoring system which views the remotely monitored reflective element from opposite sides of a predetermined axis on which the reflective element is mounted to provide a less complex and less costly system.

Still a further object of this invention is to provide a new and improved three axis angular monitoring system for monitoring the angular position of a remote object in which each axis of rotation is monitored independently with no contamination therebetween.

Still a further object of this invention is to provide a new and improved three axis angular monitoring system which is characterized by simplicity and ease of mounting and alignment tha prior combined optical instruments for providing three axis information.

Still a further object of this invention is to provide a new and improved three axis angular monitoring system in which a double off-axis look at the remotely mounted reflector may be provided in a single combined instrument.

In carrying out this invention in one illustrative embodiment thereof, a three axis angular monitoring system for detecting angular rotation of a reflector mounted on a remote element whose angular position is desired to be known comprises a reflective element mounted on a predetermined axis which is viewed by first and second optical apparatus. The first optical apparatus comprises an autocollimator having a source of radiation, means for producing a beam from that source, a first beam splitting means in said beam having a first path through said beam splitting means and a first detector means in a second path through the beam splitting means and a first lens means for collimating the beam aimable at the reflective element. The second optical apparatus has at least a second lens means aimable at the reflective element and a second detector means in optical alignment with the second lens means. The first and second lens means of said first and second optical apparatus are aimed at the reflective element at equal angles on opposite sides of said predetermined axis for providing off-axis viewing of the reflective element for monitoring the angular movement of the reflective element. The reflective element is a tetrahedral reflector and may be in the form of a mosaic array of pyramidal reflectors. The second optical apparatus may be an autocollimator similar to the first optical apparatus for doubling the images and providing double confirmation of the angular information provided by the system.

Accordingly, two optical instruments are mounted on opposite sides of the mounting axis of the reflector for providing off-axis looks at the angular position of the reflector. The same opposite side off-axis looks can be provided by an alternate embodiment in a single instrument.

BRIEF DESCRIPTION OF THE DRAWINGS

The invention, together with further objects, features, aspects and advantages thereof may be more clearly understood from the following description taken in connection with the accompanying drawings in which the same reference numerals will be applied to like elements throughout the various views.

DESCRIPTION OF THE PREFERRED EMBODIMENTS

Figure 1:
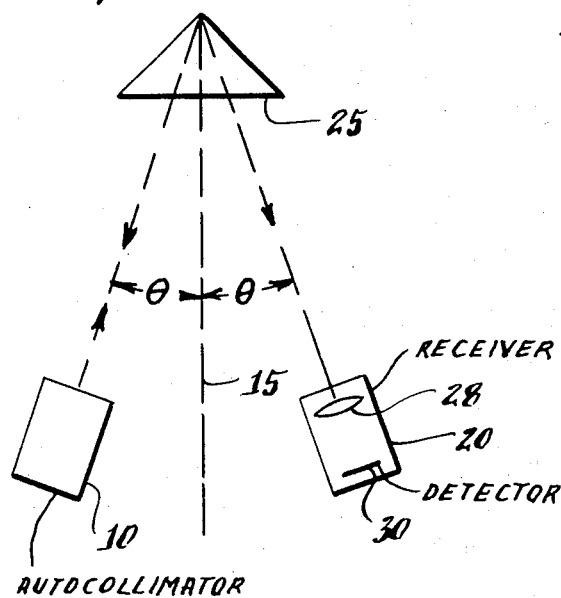
FIG. 1 is a schematic diagram of an illustrative embodiment of a three axis angular monitoring system in accordance with the present invention.
Figure 2:
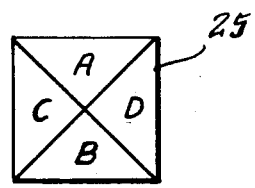
FIG. 2 is an axial face view of the tetrahedral reflector illustrated in FIG. 1.
Figure 4:
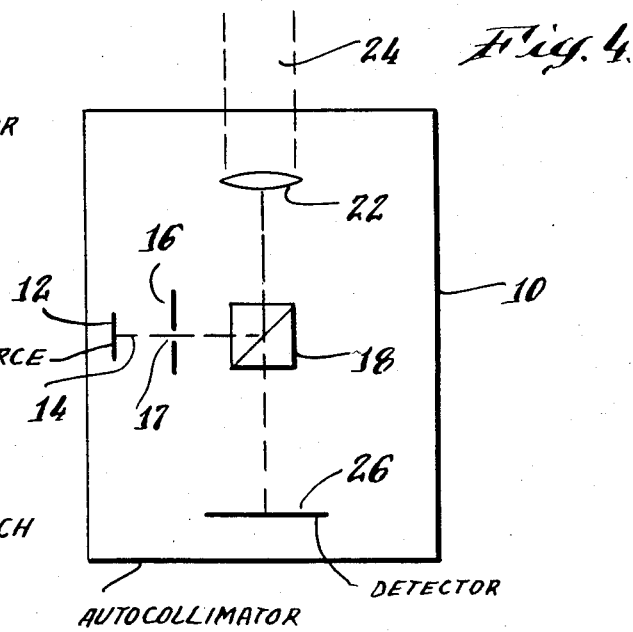
FIG. 4 shows one form of transmitter-receiver which may be utilized for the autocollimator or autocollimators when more than one are used in the system shown in FIG. 1.

Referring now to FIG. 1, a three-axis angular monitoring system in accordance with the present invention is provided having a first optical apparatus 10 and a second optical apparatus 20, both of which are aimed at equal angles $\theta$ on opposite sides of a predetermined mounting axis 15 of a tetrahedral reflector 25. The first optical apparatus 10 is an autocollimator which is both a projector and a receiver and includes the elements illustrated in FIG. 4. As will be seen in FIG. 4, a radiation source, either visible or infrared 12, which may be in the form of a light emitting diode, is formed into a beam 14 by a reticle 16 having a pinhole 17 therein which beam is applied to a beam splitter 18 and reflected therefrom through an aimable collimating lens 22 which projects a collimated beam 24 toward the reflector 25. The beam is ultimately returned through the lens 22 and the beam splitter 18 and imaged on a detection plane having a detection means 26, preferably in the form of a CCD array or a CID array, for detecting the return position of the image projected by the autocollimator 10.

Figure 3:
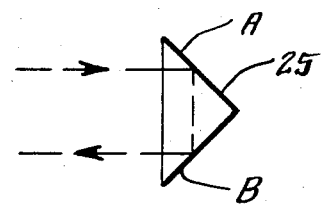
FIG. 3 is a diagramatic side view illustrating reflection from two faces of the tetrahedral pyramidal reflector of FIG. 2.

The second optical apparatus as illustrated in FIG. 1 is simply an optical receiver 20 having a lens 28 and a detector 30 which is the same in type and configuration as the detector 26 of the autocollimator 10. As will be pointed out hereinafter the second optical apparatus 20 may be identical to the first optical apparatus or autocollimator 10 but in the illustrated form acts only as a receiver and not as a projector. The prism 25 is the remotely positioned reflector with four reflecting faces in two pairs; A and B, and C and D. Faces C and D comprise a Porro reflector with a vertical roof edge which are truncated by faces A and B comprising a second Porro reflector with an incipient horizontal roof edge. If autocollimator 10 floods the reflector 25 with a beam of radiation emanating from the pinhole aperture 17 and collimated by the lens 22, reflecting faces C and D will act as a retro pair to return part of the beam to autocollimator 10. Faces A and B reflect the beam as shown in FIG. 3 from autocollimator 10 into the receiver 20. Keep in mind that if the receiver 20 were an autocollimator in the same form as autocollimator 10 that it would project a beam just the reverse of autocollimator 10 which in effect would double the images to provide a double confirmation of position which is indicated by the instrument of FIG. 1.

Figure 5:
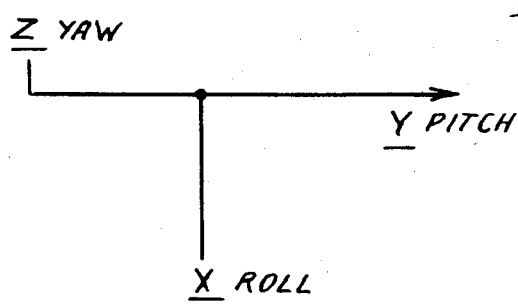
FIG. 5 illustrates the three information axes yaw, pitch and roll which are being monitored by the system of the presen invention.
Figure 6:
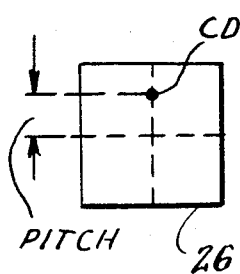
FIGS. 6 through 9 are diagramatic illustrations of the position of the returned image on the detectors of the system which can be utilized for determining the three axis angular information desired.
Figure 7:
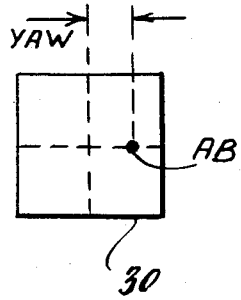
Figure 8:
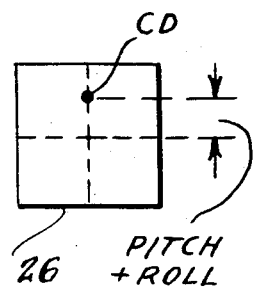
Figure 9:
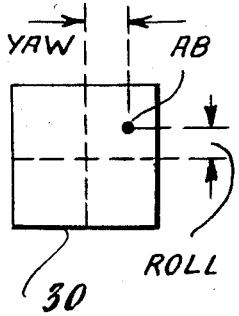

FIG. 5 illustrates the three axes around which angular information is desired with respect to the rotation and translation of reflector 25 positioned on an axis 15. Assuming that the reflector 25 is perfectly aligned as viewed by the autocollimator 10 and the receiver 20, the images provided therefrom would fall on the exact center of each rectangular coordinate formed by the detector arrays 26 and 30. If however, a rotation occurs around the Y axis (pitch) the CD image illustrated in FIG. 6 will move vertically. The pitch of the rotation can be determined by the amount of the vertical movement of CD from the center position on the detector 26, since the beam reflected from surfaces C and D return to the autocollimator 10 and the image therefrom is applied to detector 26. This change will have no effect on image AB which is reflected to the receiver 20 and applied to the detector 30. If there is a rotation about the Z axis (yaw), image AB moves laterally on detector 30 and yaw is measured by the deviation of image AB from the center position on detector 30 (see FIG. 7). A rotation around the X axis (roll) in addition to the rotation around Y (pitch) splits the CD image vertically as shown in FIG. 8 with the deviation of the midpoint from the center of the detector 26 proportional to pitch and the separation proportional to roll. The AB image splits vertically for roll as shown in FIG. 9 which provides confirmation of the roll being provided by the CD image o detector 26 in FIG. 8.

The benefit of the optical apparatus of FIG. 1 is simplicity, and the use of less elements to obtain three-axis information. However, when the receiver 20 is replaced with an autocollimator similar to autocollimator 10, the beams from the sources in each autocollimator are not only returned but are reflected into the other autocollimator thereby providing four images with a double confirmation of three-axis information. In such a combination, assuming that both first and second optical apparatus 10 and 20 are autocollimators of the same structure, a rotation in pitch would move the images formed by sequential reflection from CD (or D and C) in both autocollimators in the same vertical direction; a yaw rotation would produce no image movement from C and D; and a roll rotation would produce vertical movements in opposite directions on the detectors of both autocollimators. The images formed by sequential reflections from A and B (or B and A) of reflector 25 would produce the following characteristics; a pitch rotation would have no effect; a yaw rotation moves the image laterally in the same direction on both detectors and a rotation producing roll moves the images vertically in opposite directions in both detectors. Thus, by using two autocollimators in the configuration shown in FIG. 1, double confirmation is provided with respect to the angular movement in three axes. When the reflector 25 is in perfect alignment, the off-axis looks of two equally spaced autocollimators on opposite sides of the alignment axis 15 would produce a center position on the detectors of both autocollimators.

The accuracy of the system with respect to the roll axis will depend on the distance between the reflector 25 and the first and second optical apparatus 10 and 20 in relation to their separation and is directly proportional to the sine of the angles $\theta$.

Figure 10:
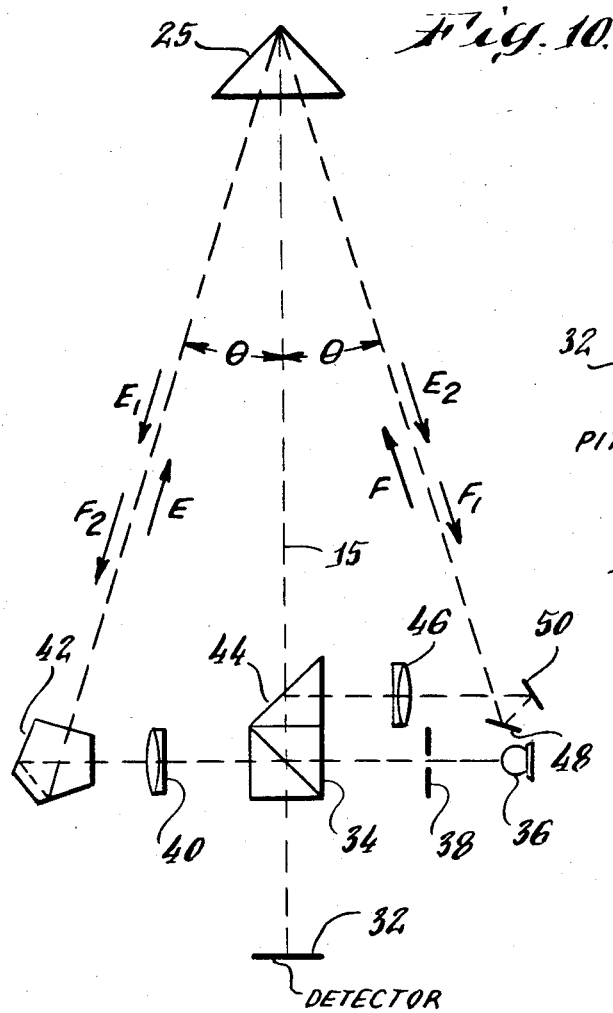
FIG. 10 is an optical schematic diagram of another embodiment of the three axis angular monitoring system in accordance with the present invention in which opposite side off-axis looks at the remote reflective element are incorporated in a single instrument.

In another embodiment which is illustrated in FIG. 10, a new autocollimator of unique design is used to derive the same measurements as the previously described systems using one autocollimator and a receiver or two autocollimators. In both the other instruments in order to measure roll, an off-axis look angle is required. When the path length is long for the required measurement, a proportionately large separation between the instruments is necessary. Furthermore, for either long or short paths, a long focal length is desired in order to achieve measuring accuracy; adequate intensity in the images favors large objective lens apertures; and this combination including the need for incorporating a light source, a CCD detector array and beam splitter imply a bulky instrument. In addition, the pointing directions of the autocollimators must be extremely stable as a twist of one autocollimator relative to the other around the line joining them would seriously affect roll measurements in particular. Measuring all three deviations (X, Y and Z) in a single instrument therefore provides obvious advantages. Furthermore, if the off-axis elements are relatively small and light in weight, maintaining their rotational stability around the line joining them becomes easier. All of these advantages are provided by the single instrument configuration illustrated in FIG. 10 which utilizes as in the past, the tetrahedral reflector 25 positioned on the platform or element to be monitored on an axis 15 which in this case is also the optical axis of the instrument. The single instrument autocollimator includes a radiation detector 32, preferably in the form of a CCD or CID (XY coordinate) array, and a beam splitter 34. A radiation source 36, preferably in the form of a light emitting diode (LED) which might emit optical radiation in the form of light or infrared which is passed through a pinhole reticle 38 through a collimating objective lens 40 in one path to an outbound reflector 42 illustrated as a pentaprism. The radiation of source 36 is also applied through the beam splitter 34 and a reflector 44 through a collimator objective lens 46 to a pair of first surface mirrors 48 and 50 arranged to function similarly to a pentaprism. The pair of first surface mirrors 48 and 50 could both be replaced by a simple plane mirror or reflecting prism but both they and the reflector 42 are preferred in the form shown for mirrors 48 and 50. The reflector 44 could also be a simple mirror, a reflecting prism separated from the beam splitter 34 or cemented to it, or combined with the upper half of the beam splitter in a single optical element.

In operation when the light source 36 is energized, light or infrared radiant energy is partially reflected and partially transmitted at the beam splitter 34. The reflected portion is collimated by objective lens 40 and reflected by the pentaprism 42 or equivalent mirrors to the reflector 25 in an illumination path E. The illumination in path E is divided in a manner previously explained with respect to the other two instruments. Surfaces C and D of the pyramidal reflector 25 reflect a portion of the light back through elements 42, 40 and beam splitter 34 to the detector 32 which illuminatidn path is called E1. Surfaces AB of the reflector 25 reflect an additional portion of E, approximately 50%, of the incident light in a path E2 through elements 50, 48, 46, 44, and 34 to the detector 32. Accordingly, two images are formed on the detector 32 by illumination reflected from the reflector 25 through paths E1 and E2. If the reflector 25 is perfectly aligned, images E1 and E2 will be coincident and at the center of the detector 32.

At the same time, light reflected by the beam splitter 34 forms illumination path F giving rise to reflections from the tetrahedral reflector 25 producing F1 and F2, thereby producing two additional images on the detector 32. Again, with perfect alignment of the reflector 25 these images will all be superimposed at the center of the detector 32.

Figure 11:
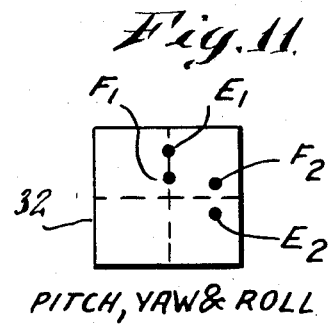
FIGS. 11 through 17 are diagramatic illustrations of the positioning information which is obtained from the instrument illustrated in FIG. 10 for obtaining three axis angular information.
Figure 12:
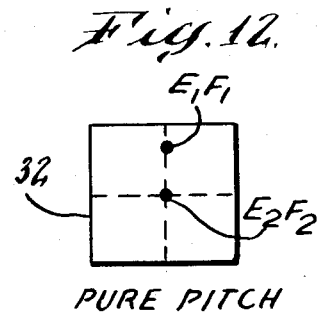
Figure 13:
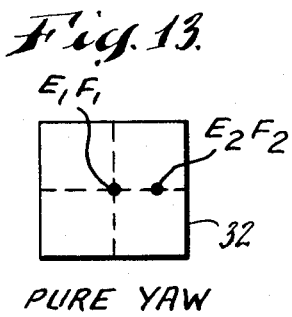

Rotating the reflector 25 about all three axes produces four images on the detector 32 as is illustrated in FIG. 11 representing one possible combination of pitch, yaw and roll. The explanations which were previously given with respect to the images as they appear on the detector are still applicable. FIGS. 12-17 illustrate a number of combinations of three possible rotations of the reflector 25 as measured by the unitary autocollimator instruments with its off-axis looks.

Figure 14:
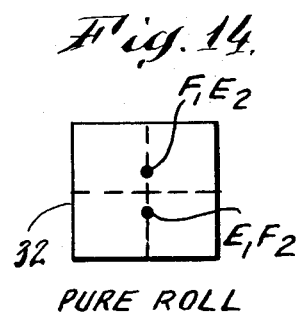
Figure 15:
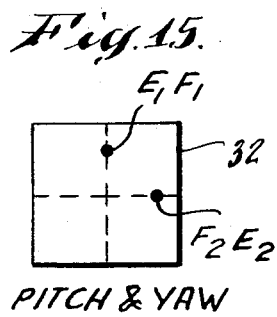
Figure 16:
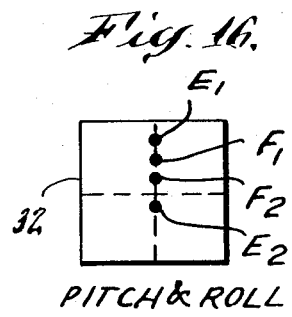

A problem arises, however, in the fact that the sense of the roll rotation is lost. In FIG. 14, for example, illustrating pure roll, the pattern sketched is typical for a positive rotation around the X axis which follows the right hand rule for rotation around an axis. A negative rotation around the X axis of the same magnitude would produce a similar pattern with the images E1, F2 above the center and images E2, F1 below it.

Several ways may be provided of treating this problem. The first is by means of modifying the relative intensities of the reflectance and transmittance at the beam splitting surface of the beam splitter 34. Each path encounters the beam splitter twice, some only by reflection, some only by transmission, and some by both. If the intensity division at the beam splitter is 50-50, the intensity of each image will be approximately equal. If on the other hand, the beam splitter reflects 30% and transmits 70%, for example, the four images have relative intensities as follows:

| PATH | INTENSITY |
| --- | --- |
| E1 | .09 |
| E2 | .21 |
| F1 | .49 |
| F2 | .21 |

The marked difference between E1 and F1 make it possible to identify them and by inference, E2 and F2 whereby the sense of the roll may be derived.

Another viable method of providing a sense for the roll measurement would be to introduce a chopper, for example, between the beam splitter 34 and the lens 40. In the presence of the chopper blade, the only open path is provided by F1 which would permit identification in a similar manner but with the loss of one frame of CCD detector output. Depending on the anticipated rotational frequencies and amplitudes of reflector 25, it may suffice to merely blank out an occasional frame for sense establishment, or it may be necessary to do this in alternate frames using the chopper. The chopper may be a mechanical blade to block the light path, an electrooptical device, such as a Kerr cell or other device. Wave length filtering or polarization are other methods which may also be employed to handle the problem of roll sense determination.

A distinct advantage of the embodiment illustrated in FIG. 10 of the single autocollimator multiple path system is the fact that the angle $\theta$ may be built into the outboard reflectors. Conceptually, plane mirrors could be used but rotation of such mirrors in any direction would be a serious threat to accuracy. The illustrated construction provides very stable outboard components.

Figure 18:
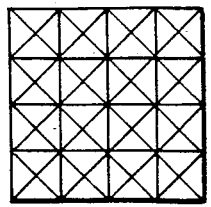
FIG. 18 illustrates a mosaic array of pyramidal reflectors which may be utilized as the remote reflector in the embodiments of FIGS. 1 and 10.
Figure 17:
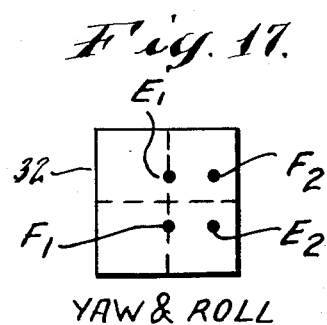

The tetrahedral prism reflector 25 may be replaced with a mosaic array of pyramidal reflectors, for example, as illustrated in FIG. 18 for providing a lighter weight reflector in proportion to the size of the surfaces required. Accordingly, the mosaic array of pyramidal reflectors reduces the prism size and accordingly, the weight of reflector 25.

Various path lengths to the tetrahedral reflector 25 require extending or retracting the outboard reflectors so that the lines of sight of the reflectors meet at the remote reflector 25. The sensitivity of the system would thus remain constant. An alternative would be to increase angle $\theta$ for a short pass while keeping the separation between the outboard reflectors constant. It should be apparent though that as the outboard reflectors are extended care must be taken not to rotate them in the planes other than the plane of the drawing. If one reflector rotates around the cross axis which separates them, pitch and roll accuracy would be compromised. Also, rotation around a third axis orthogonal to the first two would similarly produce errors. Accordingly, a support member with considerable stiffness in two directions would thus be required for mounting the outboard reflectors to provide the off-axis looks at the reflector.

The three-axis angular monitoring systems which have been disclosed offer the advantage of measuring the three axes independently with no contamination between them because the instruments making up the systems which have been proposed herein separate the three-axis measurements and do not employ a common optical path for all three measurements. In addition, the system is capable of measuring relatively large angular rotations which for the most part would require larger apertures, greater size and exponential increases in cost required by such larger elements. Certain types of alignment procedures, for example, those taking place in space, would dictate limiting both size and weight, which is an advantage of the present system. The lines of sight of the outboard reflectors must be pointed at the reflector which, if required, can be done very accurately using a laser beam which can be introduced when needed through the beam splitter defining a rather concentrated collimated beam to the reflector for initial alignment purposes. The reflector could also be supplied with a specific target for alignment using a laser beam. Otherwise, typical alignment procedures for aiming the outboard reflectors could be utilized.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. A three-axis angular monitoring system for detecting angular movement of a reflective element mounted on a remote element whose angular postion is desired to be known, comprising:
   said reflective element being mounted on a predetermined axis,
   a first optical apparatus comprising an autocollimator having a source of radiation, means for producing a beam from said source, a first beam splitting means in said beam for providing a first and a second path for said beam passing through said beam splitting means, first detector means in said second path passing through said beam splitting means for detecting radiation from said source, and a first lens positioned between said beam splitting means and said reflective element for collimating said beam aimable at said reflective element,
   a second optical apparatus having at least a second lens means aimable at said reflective element and a second detector means for detecting radiation from said source in optical alignment with said second lens means,
   said first and second optical apparatuses having said first and second lens means aimed at said reflective element at equal angles on opposite sides of said predetermined axis for providing off-axis viewing of said reflective element by said first and second detector means for monitoring the angular movement of said reflector element.

2. The system as claimed in claim 1 in which said reflective element is a tetrahedral reflecting means.

3. The system as claimed in claim 1 in which said second optical apparatus includes a second source of radiation, a second means for producing a second beam of radiation and a second beam splitting means in optical alignment with said second source in a third path and in optical alignment with said second lens means and said second detector means in a fourth path forming a second autocollimator whereby said system provides angular monitoring of said reflective element using two autocollimators thereby providing double confirmation of the angular position of said reflective element.

4. The system as claimed in claim 3 in which said reflective element comprises a pyramidal refletor.

5. The system as claimed in claim 3 in which said reflective element comprises a mosaic array of pyramidal reflectors.

6. The system as claimed in claim 3 in which said first and second detector means comprise CCD arrays.

7. A three-axis angular monitoring system for detecting angular movement of a remotely mounted reflector means comprising:
   said reflector means being a pyramidal reflector means mounted on an optical axis,
   first and second reflecting means aimed at said pyramidal reflector means from equal angles on opposite sides of said optical axis for providing off-axis viewing of said pyramidal reflector means,
   beam splitting means in optical alignment with said first and second reflecting means for establishing two optical paths between said beam splitting means and said pyramidal reflector means,
   a source of radiation in optical alignment with said beam splitting means for dividing said source of radiation between said two optical paths,
   a detector means in optical alignment with said beam splitting means for detecting radiation from said source reflected from said pyramidal reflector means applied thereto from said first and second optical paths via said beam splitting means and said first and second reflecting means.

8. The system as claimed in claim 7 wherein said detector means comprises a CCD array.

9. The system as claimed in claim 7 in which either or both of said first or said second reflecting means comprises a pentaprism.

10. The system as claimed in claim 7 wherein either or both of said first or said second reflecting means comprises a complementary pair of said first surface mirrors arranged to function similarly to a pentaprism.

11. The system as claimed in claim 10 including a third means positioned on said optical axis in optical alignment with said pair of first surface mirrors and said beam splitting means in said second optical path.

12. The system as claimed in claim 7 having a small aperture reticle positioned in front of said source of radiation.

13. The system as claimed in claim 7 having a collimating lens positioned in said first and second optical paths.

14. The system as claimed in claim 7 wherein said reflector means comprises a mosaic array of pyramidal reflectors.

15. A three-axis angular monitoring system for monitoring the angular position of a remotely mounted reflecting means:

said reflecting means being a tetrahedral reflecting means mounted on an axis, a first optical instrument and a second optical instrument mounted at equal angles on opposite sides of said axis with both instruments being aimed at said tetrahedral reflecting means, and detector means being sensitive to radiation from said source in each of said first and second optical instruments for receiving and detecting radiation reflected from said tetrahedral reflecting means for determining the angular position of said tetrahedral reflecting means with respect to said axis.

16. The system as claimed in claim 15 wherein said first and second optical instruments are both autocollimators each having a radiation source for transmitting radiation to said tetrahedral reflecting means, said detector mens detecting radiation from either source, means for receiving and applying reflected radiation from said tetrahedral reflecting means to each of said detector means in each of said first and second optical instruments for monitoring the angular position of said tetrahedral reflecting means.

* * * * *